United States Patent [19]

Kobayashi et al.

[11] Patent Number: 5,652,932
[45] Date of Patent: Jul. 29, 1997

[54] FINDER VISUAL FIELD SWITCHING MECHANISM

[75] Inventors: Hideo Kobayashi; Mitsuo Manabe, both of Omiya, Japan

[73] Assignee: Fuji Photo Optical Co., Ltd., Saitama, Japan

[21] Appl. No.: 705,256

[22] Filed: Aug. 29, 1996

[30] Foreign Application Priority Data

Sep. 7, 1995 [JP] Japan ............................. 7-230479

[51] Int. Cl.⁶ ...................... G03B 13/10; G03B 17/02
[52] U.S. Cl. ...................... 396/378; 396/435; 396/436
[58] Field of Search ..................... 396/378, 435, 396/436, 380

[56] References Cited

U.S. PATENT DOCUMENTS

| | | | |
|---|---|---|---|
| 3,619,202 | 11/1971 | Bellows | 396/378 |
| 5,325,140 | 6/1994 | Torkoshi et al. | 396/436 |
| 5,430,517 | 7/1995 | Zander | 396/378 |
| 5,493,356 | 2/1996 | Tokui | 396/435 |
| 5,504,548 | 4/1996 | Katagiri et al. | 396/436 |
| 5,541,684 | 7/1996 | Suzuki et al. | 396/380 |

*Primary Examiner*—Safet Metjahic
*Assistant Examiner*—Michael Dalakis
*Attorney, Agent, or Firm*—Sixbey, Friedman, Leedom & Ferguson; David S. Safran

[57] ABSTRACT

When a switching control on an outer wall of a camera is operated and stopped at a click groove corresponding to a desired aspect ratio (for example, C), a CHP lever moves up together with the switching control, and the displacement of the CHP lever is transmitted to an axis rotating lever via a spring. A rotational stroke of the axis rotating lever is smaller than a moving stroke of the CHP lever. A displacement of the CHP lever exceeding the rotational stroke of the axis rotating lever is absorbed by the deformation of the spring. The axis rotating lever is positioned steadily at one of ends of the stroke by the elastic force induced by the deformation of the spring. As a result, the ends of stroke holes in visual field frame pieces can abut against positioning pins without fail.

4 Claims, 9 Drawing Sheets

FINDER VISUAL FIELD SWITCHING MECHANISM

BACKGROUND OF THE INVENTION

1. Field of the Invention

The present invention relates to a finder visual field switching mechanism, and more particularly to a switching mechanism for a switching visual field frame, which is capable of switching a plurality of visual field patterns conforming to a print aspect ratio selected during the photographing.

2. Description of the Related Art

The conventional optical finder incorporated into a camera is constructed in such a manner that an objective lens, a prism, and an eyepiece are arranged in a finder unit body frame, and the subject light passing through the objective lens is bent by the prism and is led to the eyepiece so that the subject image can be observed through the eyepiece.

A visual field frame for controlling the range of the visual field is arranged on a light path of a finder optical system. There is known a visual field frame composed of a switching visual field frame provided with a visual field switching mechanism which can determine a visual field conforming to a print aspect ratio (PAR). For example, there is proposed a CHP switching visual field frame which is able to select one size among conventional (C), high-vision (H), and panoramic (P) for photographing, and switch the visual fields conforming to the PAR.

However, the conventional switching visual field frame ordinarily expands and contracts the range of the visual field by moving a pair of L-shaped visual field frame pieces arranged to face each other vertically in a direction so that they can become closer to each other or far from each other. The power for switching the visual fields is mechanically transmitted via gears and/or connecting members; therefore, a power transmitting mechanism is faced with a problem of being unsteady, and a visual field conforming to the PAR cannot be determined accurately.

SUMMARY OF THE INVENTION

The present invention has been developed under the above-described circumstances, and has its object the provision of a finder visual field switching mechanism, which can reduce the unsteadiness in a switching mechanism for switching a finder visual field, and which can accurately determine a visual field conforming to a PAR.

In order to achieve the above-described object, a visual field switching mechanism of a finder having a first visual field frame arranged on an image-formation plane of subject light passing through an objective lens for restricting the subject light to a visual field conforming to a first aspect ratio, and a second visual field frame arranged close to the first visual field frame and composed of a pair of substantially L-shaped visual field frame pieces for moving the pair of visual field frame pieces in a direction so that a left-hand side and a right-hand side of the second visual field frame become closer to each other so as to determine a visual field conforming to a second aspect ratio, and moving the pair of visual field frame pieces in a direction so that a top side and a bottom side of the second visual field frame become closer to each other so as to determine a visual field conforming to a third aspect ratio, and in which a visual field conforming to one of the first, second and third aspect ratios can be selectively switched, comprises: a switching control movably held on an outer wall of a camera and selectively moved to one stop position among three stop positions corresponding to the each aspect ratio; a first lever connecting to the switching control and moving together with the switching control; a second lever having a second movement area smaller than a first movement area of the first lever and moving together with the first lever to transmit power for moving the visual field frame pieces; positioning stoppers for stopping the visual field frame pieces moved by the power transmitted by the first lever and the second lever at a predetermined position where a visual field conforming to the second aspect ratio or the third aspect ratio is determined; and an elastic member provided between the first lever and the second lever, transmitting a displacement of the first lever to the second lever, and deforming elastically in response to a displacement of the first lever exceeding the second movement area of the second lever; and is characterized in that the second lever is positioned at one of end of a stroke in the second movement area by the elastic force induced by the deforming of the elastic member, so that the visual field frame pieces abut against the positioning stoppers.

According to the present invention, if a switching control on an outer wall of the camera is moved to a stop position for a desired aspect ratio, the first lever moves together with the switching control. The displacement of the first lever is transmitted to the second lever via the elastic member. The area for the second lever to move is smaller than the area for the first lever to move, so that the displacement of the first lever exceeding the area for the second lever to move is absorbed by the deformation of the elastic member. The second lever is positioned at the end of the stroke by the elastic force induced by the deformation. As a result, the visual field frames can abut against positioning stoppers, and the visual field conforming to the PAR can be determined accurately.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 10 (A) and 10 (B) are views illustrating the structure of the essential portions in the other embodiments according to the present invention.

DETAILED DESCRIPTION OF THE PREFERRED EMBODIMENTS

Figure 1:
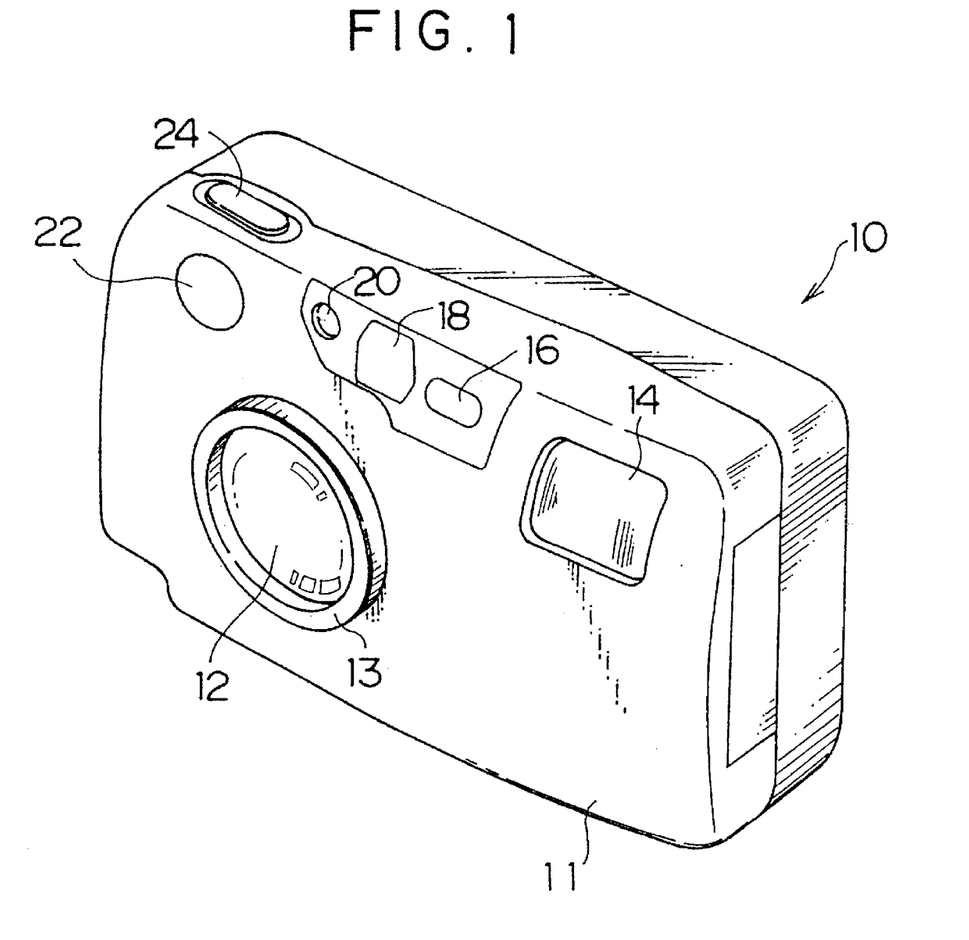
FIG. 1 is a perspective view illustrating the appearance of a camera 10 incorporating thereinto a finder unit according to the present invention.

FIG. 1 is a perspective view illustrating an appearance of a camera incorporating thereinto a finder unit to which a finder visual field switching mechanism according to the present invention is applied. A lens barrel 13 is attached to the central part of the front surface of an exterior case 11 of a camera 10 as shown in FIG. 1. A taking lens 12 is incorporated into the lens barrel 13. A strobe window 14 is formed at the upper right-hand corner of the front surface of the exterior case 11. A finder objective window 16, an AF light-projector window 18, a photometry window 20, and an AF light-acceptor window 22 are formed by the left-hand side of the strobe window 14. A shutter button 24 is provided at the top of the camera 10.

An AF light-projector part is provided at the inside of the AF light-projector window 18, and an AF light-acceptor part is provided at the inside of the AF light-acceptor window 22. An auto-focusing part (AF part) measuring a subject distance is composed of the light-projector part and the light-acceptor part. The AF part measures the subject distance based on, for example, the principle of triangulation. The result of the measurement is used for controlling the auto-focusing (AF).

A lens (not shown), through which the external light enters, and a photometry part comprising a light accepting element positioned at an image-forming position of the lens are provided at the inside of the photometry window 20. The photometry part measures the brightness of the external light within the photographic visual field. The result of the measurement is used for controlling an exposure (AE control).

The taking lens 12 is composed of an optical system, which differs according to the type of the lens. For example, a focal length is changed in a range of f=25–55 mm in a twice zooming, and the focal length is changed in a range of f=30–90 mm in a three-time zooming. A zoom button (not shown) is provided at the back of the body of the camera 10.

When the zoom button is operated, a lens driving motor (not shown) is driven. The driving force of the motor is transmitted to a driving mechanism of the taking lens 12 and a driving mechanism of a movable lens system 38 of a zoom finder via a plurality of gears. The user can select a desired magnification by operating the zoom button, and can observe a visual field, which is substantially equal to an angle of view, through an eyepiece of the finder. An explanation will be given later about the structure of the zoom finder and the driving mechanism in the movable lens system.

A shutter (not shown) is arranged on the optical axis of the taking lens 12 in the camera 10. The shutter moves in association with the operation of the shutter button 24.

Figure 2:
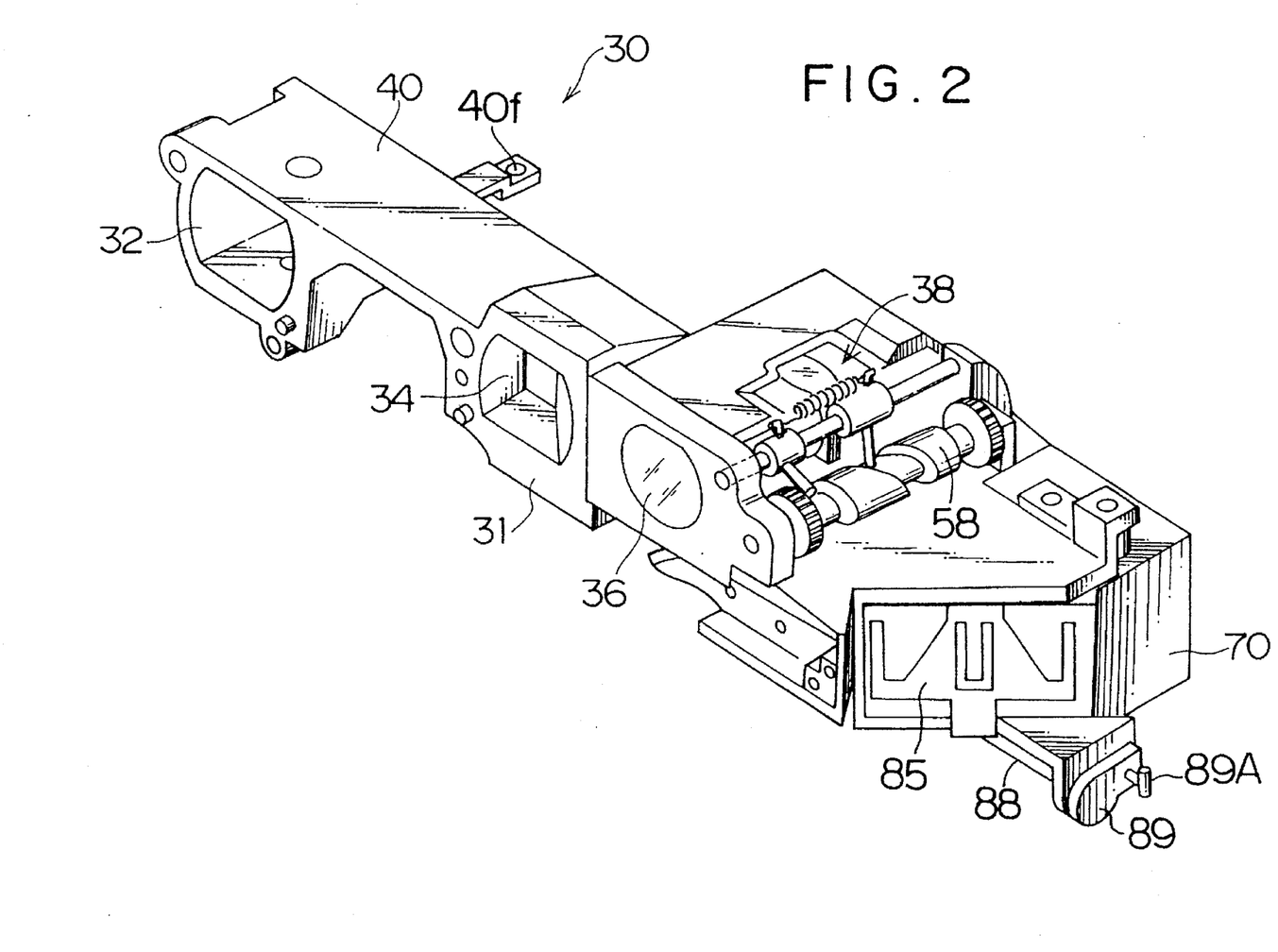
FIG. 2 is a perspective view illustrating a finder unit 30 incorporated into the camera 10.

FIG. 2 is a perspective view illustrating a finder unit 30 incorporated into the camera 10. An AF light-acceptor housing part 32 conformable to the AF light-acceptor window 22, an AF light-projector housing part 34 conformable to the AF light-projector window 18, and an objective lens 36 provided at the inside of the finder objective window 16 are arranged from the left-hand side in a unit frame 31 of the finder unit 30 as shown in FIG. 2.

Figure 3:
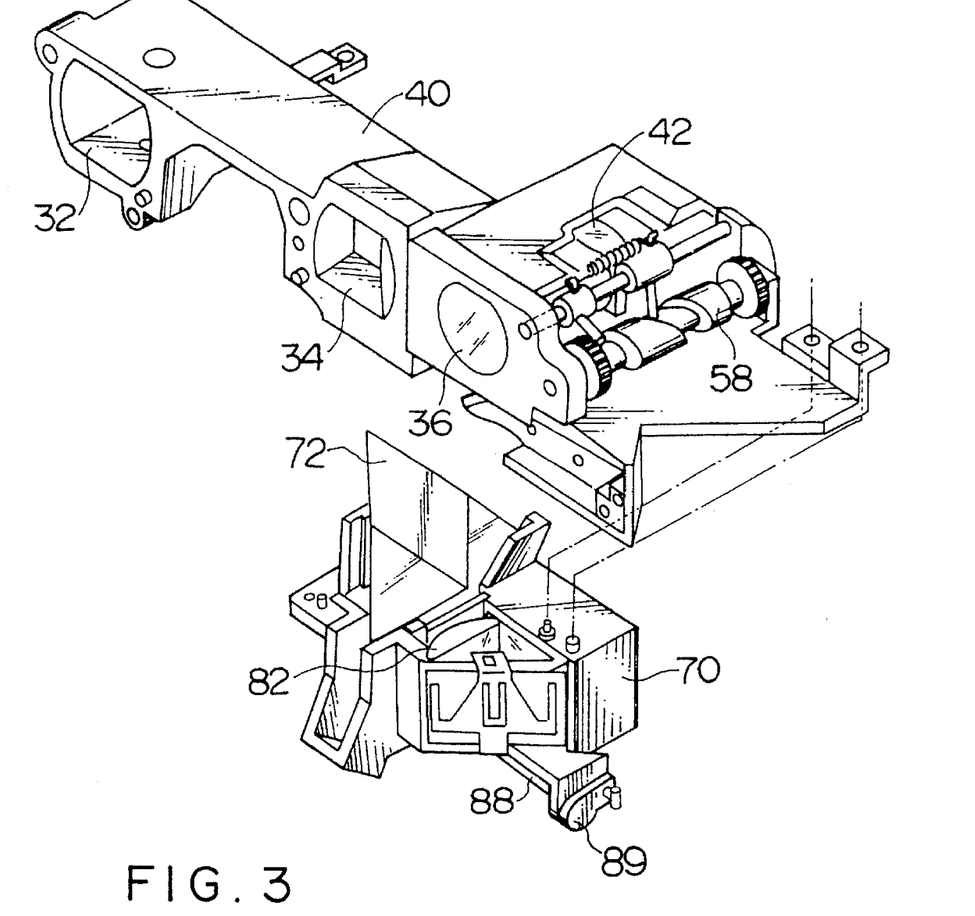
FIG. 3 is a perspective view illustrating the first block and the second block of the finder unit 30.

In the finder unit 30, the unit frame 31 is divided into a first housing frame 40 and a second housing frame 70 (see FIG. 3). The AF part (the AF light-acceptor part and the AF light-projector part), the objective lens 36, the movable lens system 38, etc. are accommodated by the first housing frame 40 to compose the first block. On the other hand, a prism 72, the eyepiece 74, etc. are accommodated by the second housing frame 70 to compose the second block.

Figure 4:
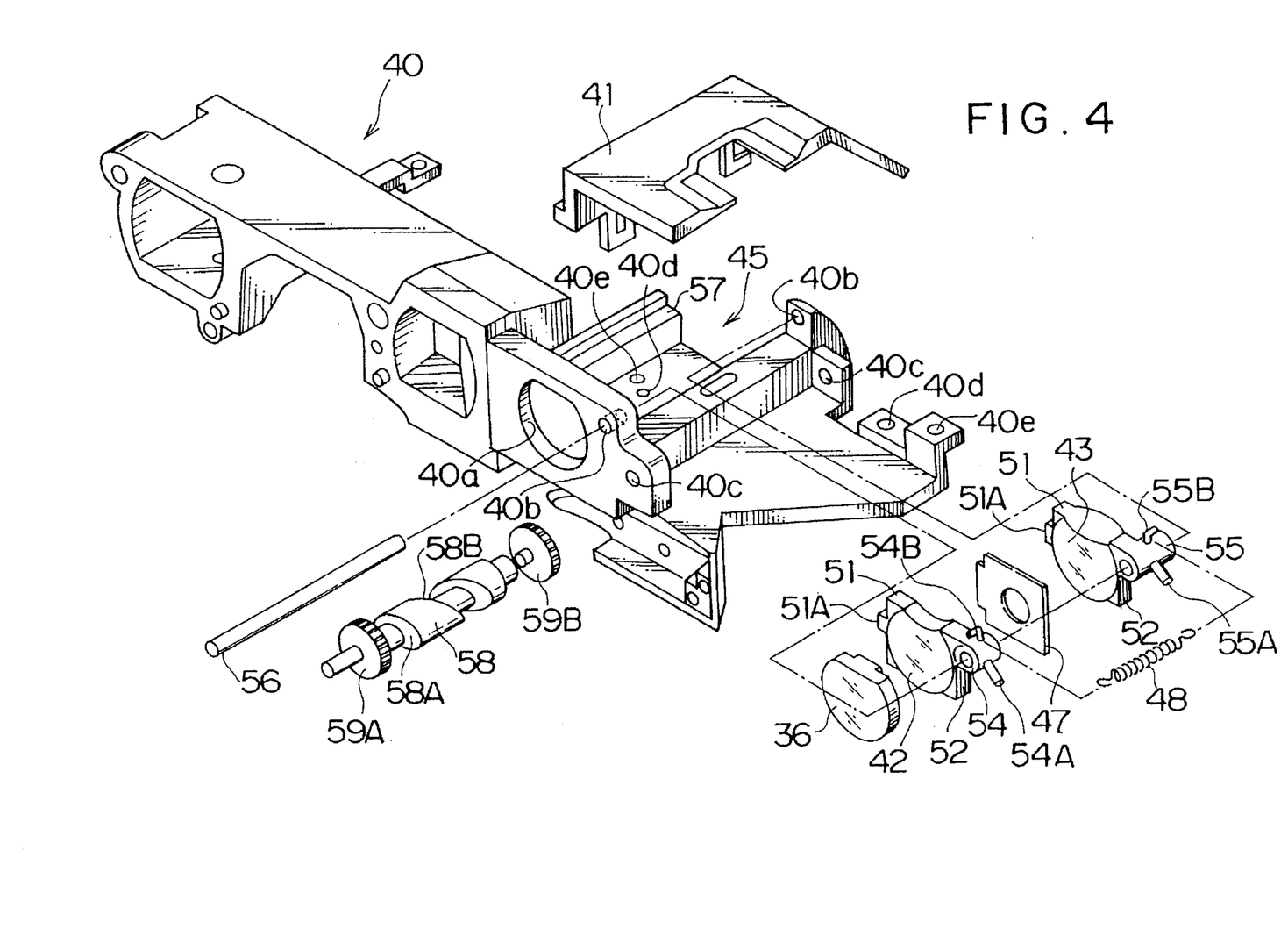
FIG. 4 is an exploded perspective view illustrating the first block of the finder unit 30.

FIG. 4 is an exploded perspective view illustrating the first block. As shown in the figure, the first block is constructed in such a manner that a finder variable magnification optical system and a driving mechanism of the finder variable magnification optical system are mounted in the first housing frame 40.

The finder variable magnification optical system is composed of the objective lens 36 and movable lenses 42 and 43. The objective lens 36 is put into an objective lens opening window 40a formed at the front of the first housing frame 40. The movable lenses 42 and 43 are received in a groove 45 to the back of the objective lens 36. A mask member 47 is provided between the movable lenses 42 and 43.

Flat parts 51 and 52 are formed at the right and left edges of the movable lenses 42 and 43. Projections 51A and 51A are provided projecting from the flat parts 51 and 51, and guide holes 54 and 55 are formed at the flat parts 52 and 52, respectively. The guide holes 54 and 55 are passed through by a guiding rod 56. The front end of the guiding rod 56 is thrust into a hole 40b formed on the front wall of the first housing frame 40, and the rear end of the guiding rod 56 is thrust into a hole 40b formed on the back wall of the first housing frame 40. As a result, the guiding rod 56 is fixed at the position.

In the first housing frame 40, a step 57 is formed at the upper part of the left-hand side of the groove 45 receiving the moving lenses 42 and 43. The projections 51A and 51A of the movable lenses 42 and 43 are located at the step 57. An objective cover 41 covers the groove 45 from above the movable lenses 42 and 43, so that a slide groove is formed by the step 57 and the bottom edge of the objective cover 41. The movable lenses 42 and 43 are guided along the slide groove via the projections 51A and 51A in such a manner to move in the forward and backward directions, and the vertical play can be controlled.

Dependent pins 54A and 55A are provided in such a manner to project from the sides of the movable lenses 42 and 43, and the dependent pins 54A and 55A are engaged with a cam shaft 58, which is a member of the driving mechanism of the finder variable magnification optical system.

The driving mechanism of the finder variable magnification optical system is composed of the cam shaft 58 and a motor (not shown) driving the cam shaft 58. The motor also serves as a driving motor for the lens barrel 13 of the taking lens 12. The rotational force of the motor is transmitted to a gear 59A secured to the cam shaft 58, via a row of gears (not shown).

Cam faces 58A and 58B, which determine an optical positional relationship of the movable lenses 42 and 43, are formed at the circumference of the cam shaft 58. Both ends of the cam shaft 58 are thrust into holes 40c and 40c, which are formed in the first housing frame 40, so that the cam shaft 58 is fixed at the position. Incidentally, a gear 59B at the back of the cam shaft 58 moves in association with a strobe mechanism (not shown).

The dependent pin 54A of the movable lens 42 is abutted against the cam face 58A at the front of the cam shaft 58. The dependent pin 55A of the movable lens 43 is abutted against the cam face 58B at the back of the cam shaft 58. L-shaped hooks 54B and 55B are formed at the top of the movable lenses 42 and 43, and an extension spring 48 is stretched between the hooks 54B and 55B. The dependent pin 54A is pressed against the cam face 58A, and the dependent pin 55A is pressed against the cam face 58B by the elastic force of the extension spring 48. As a result, the relative positions of the movable lenses 42 and 43 are regulated.

As described previously, the motor for driving the cam shaft 58 also serves as the driving motor for the lens barrel 13 of the taking lens 12. Therefore, when the motor is driven, the cam shaft 58 rotates in association with the lens barrel 13. As a result, the photographic angle of view can corresponds to the range of the finder visual field.

Figure 5:
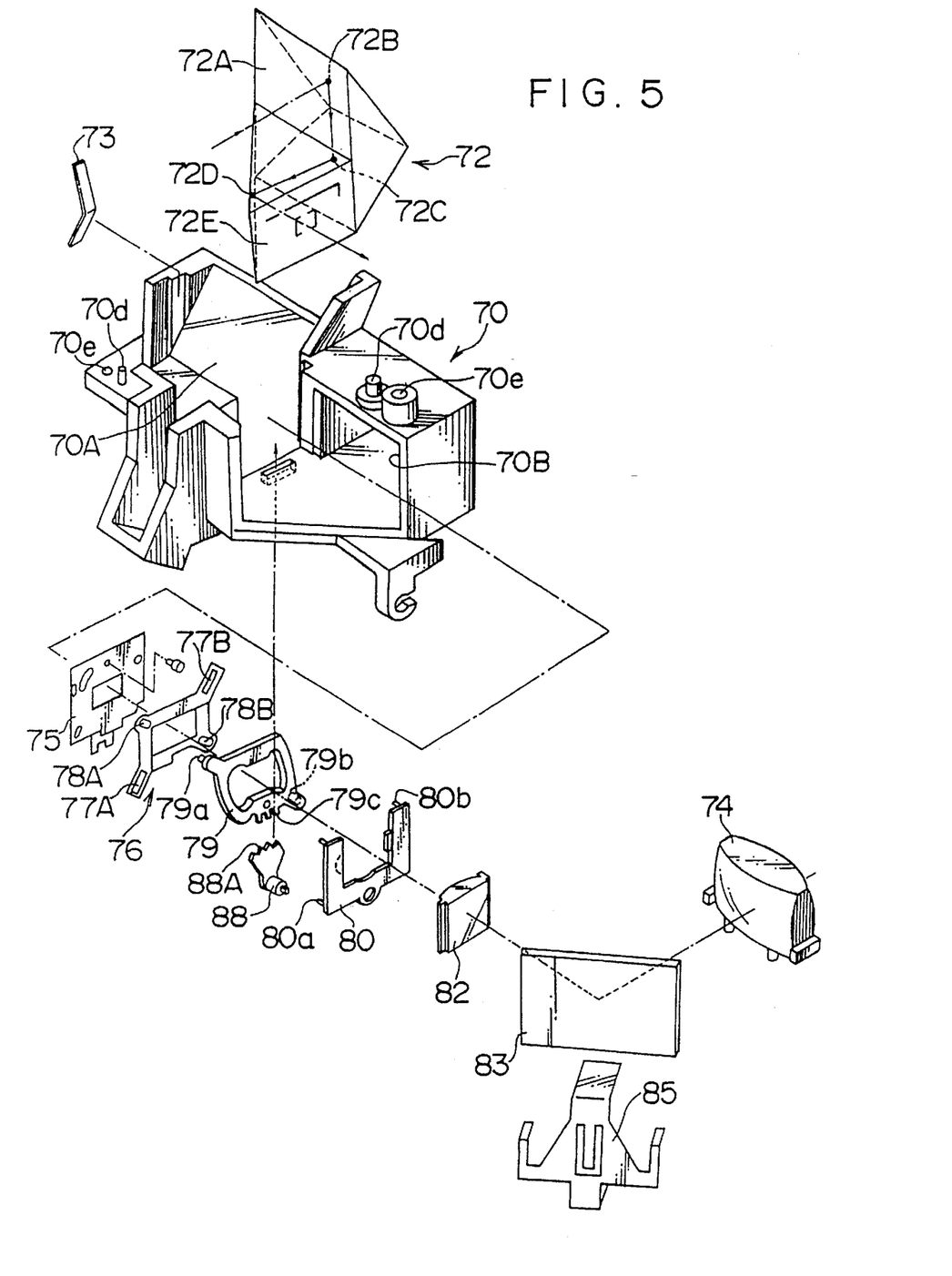
FIG. 5 is an exploded perspective view illustrating the second block of the finder unit 30.

FIG. 5 is an exploded perspective view illustrating the second block. As shown in the figure, the second block is constructed in such a manner that a prism 72, a high-vision (H) visual field frame 75 (corresponding to the first visual field frame), a conventional/panoramic (CP) visual field frame 76 (corresponding to the second visual field frame), a visual field frame switching lever 79, a visual field frame base 80, a field lens 82, a mirror 83, an eyepiece 74, etc. are mounted in the second housing frame 70.

The prism 72 is received in the second housing frame 70 along a slope 70A formed at the upper part of the second housing frame 70. The prism 72 is pressed to the right-hand side by a prism pressing plate 73 and is positioned in the second housing frame 70 steadily.

The prism 72 is formed in such a manner that two rectangular prisms are combined, and it reflects the incident subject light three times to obtain a correct image. That is, the subject light passing through the zooming optical system enters the prism 72 via an incident plane 72A, and then the subject light is reflected down by a reflection plane 72B at an angle of 90°. Then, the subject light is reflected forward by a reflection plane 72C at an angle of 90°, and then the subject light is reflected horizontally (laterally) by a reflection plane 72D at an angle of 90°. The subject light exits from an exit plane 72E, which is perpendicular to the incident plane 72A. Marks indicating a target and a compensation of parallax are inscribed on the exit plane 72E, and the subject image is formed on the exit plane 72E.

The H visual field frame 75 provided close to the exit plane 72E of the prism 72 is a fixed frame, which determines the visual field in the angle of view conforming to the high-vision (H) size (the first aspect ratio) of a PAR. The H visual field frame 75 determines an area, which is larger than later-described conventional (C) size (the second aspect ratio) or panoramic (P) size (the third aspect ratio).

Furthermore, the CP visual field frame 76 is provided to the back of the H visual field frame 75 in order to selectively determine a visual field conforming to the C or P size. The CP visual field frame 76 is composed of a pair of substantially L-shaped visual field frame pieces 76a and 76b, the visual field frame switching lever 79, and the visual field frame base 80. The pair of the visual field frame pieces 76a and 76b are combined to face each other vertically. The CP visual field frame 76 determines the visual field area of the C or P size by moving the pair of the visual field frame pieces 76a and 76b in a direction so that they become closer to each other or far from each other at an angle of 45°.

When the visual field frame pieces 76a and 76b are moved at an angle of 45° in a direction in which they become closer to each other, the right-hand side and the left-hand side of the visual field frame 76 become closer to each other, and the top side and the bottom side of the visual field frame 76 become far from each other. As a result, the conventional angle of view is determined, in which the right-hand side and the left-hand side of the high-vision angle of view are partially limited. If the visual field frame pieces 76a and 76b are moved at an angle of 45° in a direction in which they become far from each other, the top side and the bottom side of the visual field frame 76 become closer to each other, and the right-hand side and the left-hand side of the visual field frame 76 become far from each other. As a result, the panoramic angle of view is determined, in which the top side and the bottom side of the high-vision angle of view are partially limited.

Rectangular stroke holes 77A and 77B are diagonally formed at an angle of 45° at both ends of the visual field frame pieces 76a and 76b. Pins 80a and 80b (corresponding to the positioning stoppers), which are provided projecting from the visual field frame base 80, are engaged with the stroke holes 77A and 77B. Slots 78A and 78B are formed close to the corners of the visual field frame pieces 76a and 76b. Pins 79a and 79b, which are provided projecting from the visual field frame switching lever 79, are engaged with the slots 78A and 78B.

An arc guiding groove is formed at the front of the visual field frame base 80 to guide the rotation of the visual field frame switching lever 79. The visual field frame switching lever 79 is guided by the arc guiding groove so as to rotate; therefore, the visual field is switched by the visual field frame pieces 76a and 76b.

The field lens 82 is fixed to the back of the visual field frame base 80, and the mirror 83 is fixed to the back of the field lens 82. The mirror 83 is put into the edge surface part of the second housing frame 70 at an angle of 45° with regard to the exit plane of the field lens 82. A mirror pressing plate 85 presses the mirror 83 from behind, and the mirror 83 is fixed to the second housing frame 70. The optical axis of the prism 72's exit plane 72E is reflected toward the back of the camera 10 by 90°, and is led to the eyepiece 74.

The eyepiece 74 is attached to an opening 70B formed in the second housing frame 70 via a diopter adjustment cam (not shown) in such a manner to move forward and backward. The diopter adjustment cam connects to a diopter adjustment control. The user turns the diopter adjustment control so as to move the eyepiece 74 forward and backward. As a result, the diopter can be adjusted.

As described above, the second block is united so that the prism 72 and all of the optical parts behind the prism 72 can be accommodated by the second housing frame 70. On the other hand, the first block in FIG. 4 is united so that the optical parts in front of the prism 72 and the AF part can be accommodated by the first housing frame 40. In order that the second block is attached to the bottom of the first block, projections 70d and 70d (see FIG. 5), which are provided projecting from the second housing frame 70 are put into holes 40d and 40d (see FIG. 4), which are formed in the first housing frame 40 of the first block, and they are positioned in this state. Holes 40e and 40e of the first block (see FIG. 4) and holes 70e and 70e of the second block (see FIG. 5) are put together, and then they are connected by screws from above. As a result, the first and second blocks are united to be the finder unit as shown in FIG. 2.

On the other hand, a gear 79C is formed at the lower part of the visual field frame switching lever 79, and the gear 79C is engaged with a switching gear 88A. The switching gear 88A is formed at an end of a visual field switching axis 88 in FIG. 6.

Figure 6:
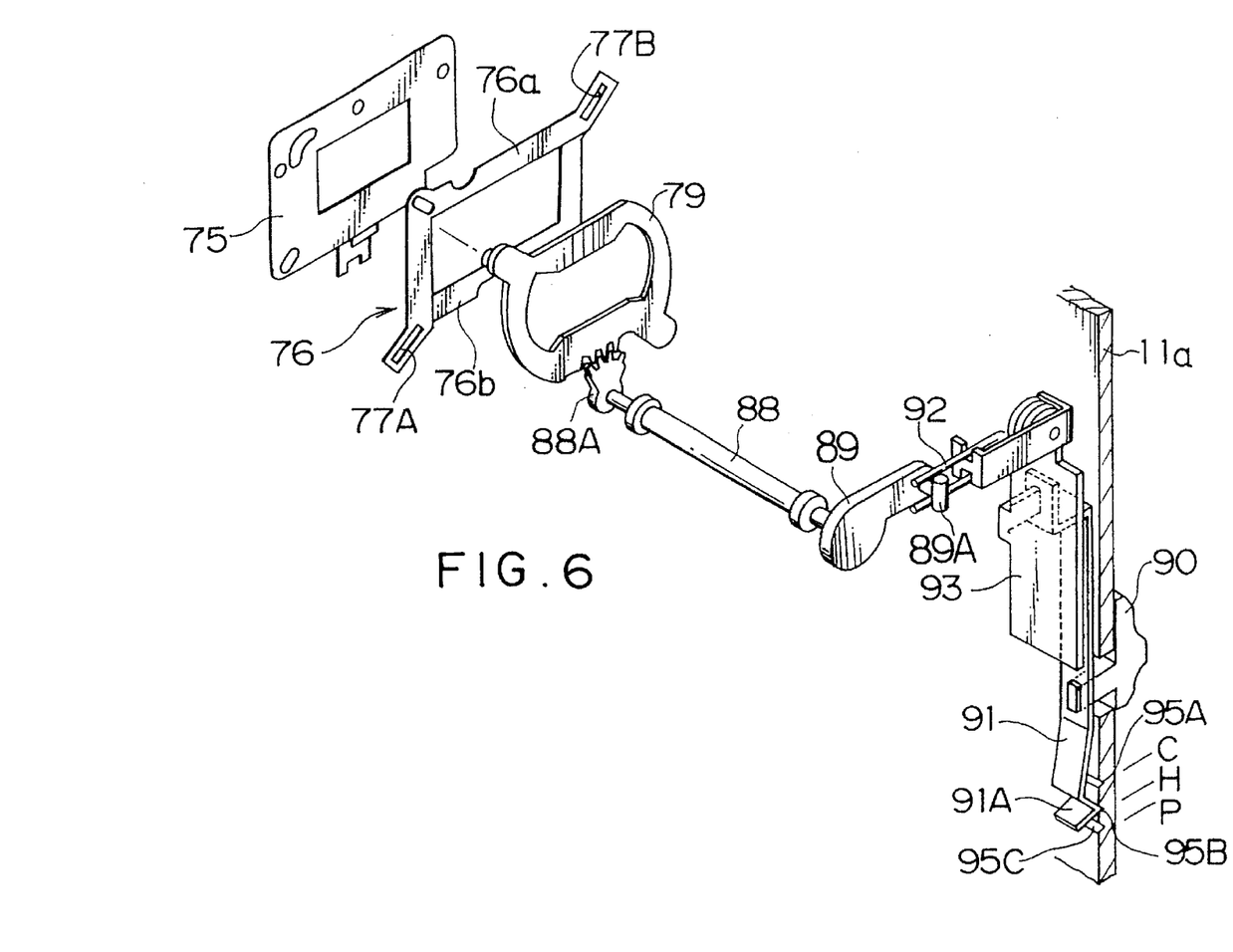
FIG. 6 is a view illustrating the structure of a finder visual field switching mechanism.

FIG. 6 is a view illustrating the structure of a visual field switching mechanism. As shown in the figure, the visual field switching mechanism comprises: a switching control 90 provided at a back face 11a of the camera in such a manner to move up and down; a PAR armature 91 connecting to the switching control 90 and moving up and down with the switching control 90; and a CHP lever 93 (The PAR armature 91 and the CHP lever 93 correspond to the first lever.) connecting to the PAR armature 91 and is provided with a spring 92 (corresponding to the elastic member) for transmitting the upward and downward movement of the PAR armature 91 to the visual field switching axis 88.

Click grooves 95A, 95B, and 95C are formed at the inside of the camera's back face 11a so as to control a position where the PAR armature 91 stops. The click grooves 95A, 95B, and 95C are used for switching of the C, H, and P sizes, respectively. A nail 91A is bent to be formed at the PAR armature 91, and the nail 91A is engaged with one of the click grooves 95A, 95B and 95C. The switching control 90 is switched in three levels C, H, and P.

One end of the visual field switching axis 88 connects to the gear 79C of the visual field frame switching lever 79 via the switching gear 88A. An axis rotating lever 89 (corresponding to the second lever) is formed at the other end of the visual field switching axis 88. A T-shaped hook 89A hooking the spring 92 is formed at the tip of the axis rotating lever 89. The visual field switching axis 88 is connected to the CHP lever 93 via the spring 92. Thus, if the switching control 90 is switched up or down, the PAR armature 91 and the CHP lever 93 move up or down. Then, the movement of the CHP lever 93 is transmitted to the visual field switching axis 88 via the spring 92.

Figure 7:
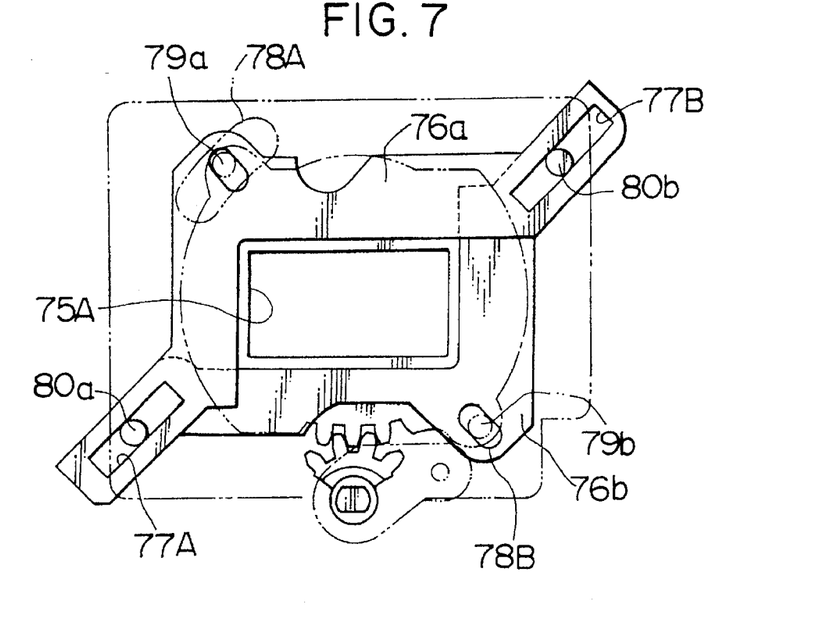
FIG. 7 is a view showing the case when a visual field is formed in a high-vision size.

If the switching control 90 is positioned at H, the PAR armature 91 is engaged with the click groove 95B to hold the CHP lever 93 at the central position. In this case, the switching gear 88A does not rotate because the spring 92 does not apply the force to the visual field switching axis 88. In this state, the pins 80a and 80b of the visual field frame base 80 are located in the center of the rectangular stroke holes 77A and 77B in the CP visual field frame 76 as shown in FIG. 7. That is, the visual field frame pieces 76a and 76b of the CP visual field frame 76 are located halfway of the stroke. The visual field area determined by the CP visual field frame 76 is sufficiently larger than an opening area 75A of the H visual field frame 75. The visual field depends on the H visual field frame 75; therefore, the visual field is high-vision (H).

Figure 8:
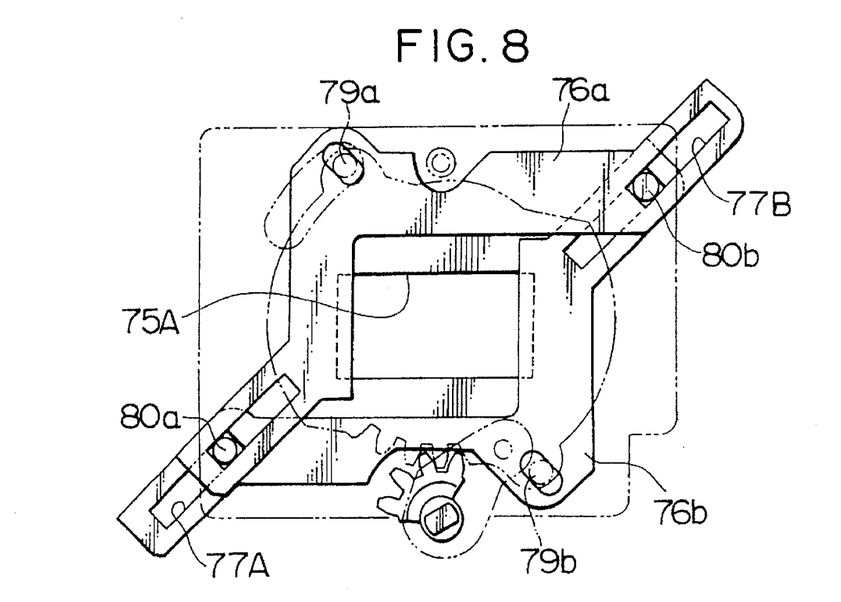
FIG. 8 is a view showing the case when a visual field is formed in a conventional size.

When the switching control 90 in FIG. 6 is positioned at C, the PAR armature 91 moves up to be engaged with the click groove 95A, and pushes up the CHP lever 93. At the same time, the visual field switching axis 88 rotates via the spring 92, and the switching gear 88A rotates counterclockwise. As a result, the visual field frame switching lever 79 rotates clockwise. That is, as shown in FIG. 8, the upper visual field frame piece 76a engaged with the pin 79a of the visual field frame switching lever 79 moves up at an angle of 45°. The lower visual field frame piece 76b engaged with the pin 79b of the visual field frame switching lever 79 moves down at an angle of 45°. The rotational length of the visual field switching axis 88 is short compared to the length in which the CHP lever 93 moves as the switching control 90 is operated. The difference in the movement length is absorbed by the spring 92. Thus, the pins 80a and 80b abut against the ends of the stroke holes 77A and 77B, and they are positioned there. As a result, the visual field area can be made narrow in the area at the right-hand side and the left-hand side of the H visual field frame 75, so that the visual field is conventional (C).

Figure 9:
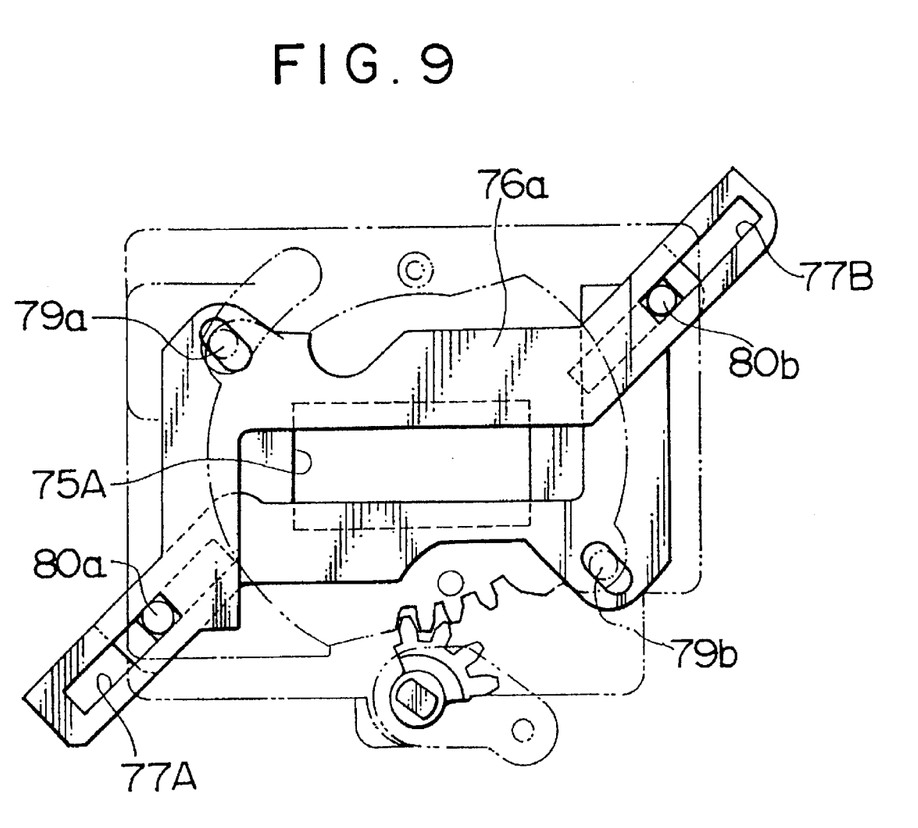
FIG. 9 is a view showing the case when a visual field is formed in a panoramic size.

When the switching control 90 in FIG. 6 is positioned at P, the PAR armature 91 moves down to be engaged with the click groove 95C, and pushes down the CHP lever 93. At the same time, the visual field switching axis 88 rotates via the spring 92, and the switching gear 88A rotates clockwise. As a result, the visual field frame switching lever 79 rotates counterclockwise. That is, as shown in FIG. 9, the upper visual field frame piece 76a engaged with the pin 79a of the visual field frame switching lever 79 moves down at an angle of 45°. The lower visual field frame piece 76b engaged with the pin 79b of the visual field frame switching lever 79 moves up at an angle of 45°. The pins 80a and 80b abut against the ends of the stroke holes 77A and 77B, and they are positioned there. As a result, the visual field area can be made narrow in the area at the top side and the bottom side of the H visual field frame 75, so that the visual field is panoramic (P).

As described above, the C or P size is a size, in which the area of the high-vision size is partially limited. Therefore, the fixed frame of the H visual field frame 75 is used, and the pair of the visual field frame pieces 76a and 76b are combined vertically, so that both visual field frame pieces 76a and 76b are moved diagonally. As a result, the visual field can be switched to conform to the H, C, or P size.

According to the finder unit to which the switching mechanism of the finder visual field frame constructed in the above-mentioned manner is applied, the subject light through the objective lens 36 enters the prism 72 via the movable lenses 42 and 43. Then, as shown in FIG. 5, the subject light is bent down and forward, and is bent further in a direction perpendicular to the incident optical axis, that is, the width direction of the camera 10. The subject light is formed on the exit plane 72E of the prism 72. The path of the subject light is bent in the incident direction (forward) by the prism 72, so that the finder unit 30 can be thin. The image formed on the exit plane 72E can be observed through the eyepiece part via the field lens 82 and the eyepiece 74.

If the user changes the focal length of the taking lens 12 by operating the zoom switch, the cam shaft 58 rotates (see FIG. 4) by a gear rotating in association with a focus changing mechanism of the taking lens 12. The subject image, of which magnification is substantially equal to the magnification changed by the taking lens system, can be formed at the eyepiece part of the finder.

If the user selects a desired aspect ratio by operating the switching control 90, the CHP lever 93 moves together with the switching control 90. The displacement of the CHP lever 93 is transmitted to the axis rotating lever 89 via the spring 92, and the visual field switching axis 88 rotates. In this case, the rotational stroke of the axis rotating lever 89 is smaller than the up and down moving stroke of the CHP lever 93. The displacement of the CHP lever 93 exceeding the rotational stroke of the axis rotating lever 89 is absorbed by the deformation of the spring 92. Thus, the axis rotating lever 89 is positioned steadily in one of ends of the rotational stroke. As a result, as shown in FIGS. 8 and 9, the visual field frame pieces 76a and 76b are positioned steadily in such a position that the visual field conforming to the desired PAR is determined.

Figure 10A:
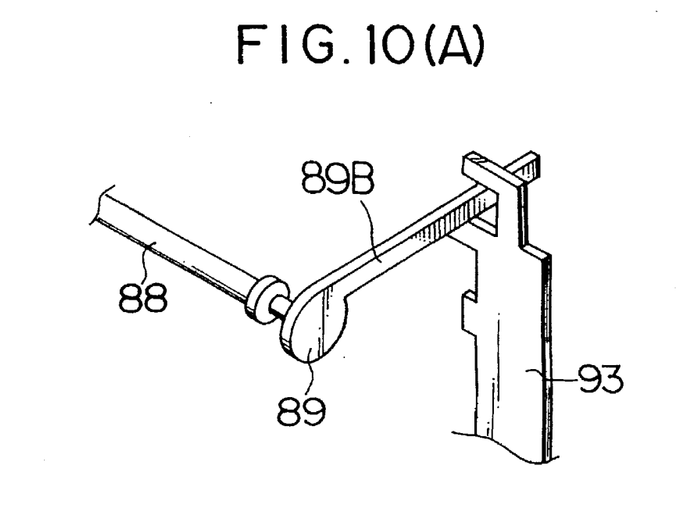
Figure 10B:
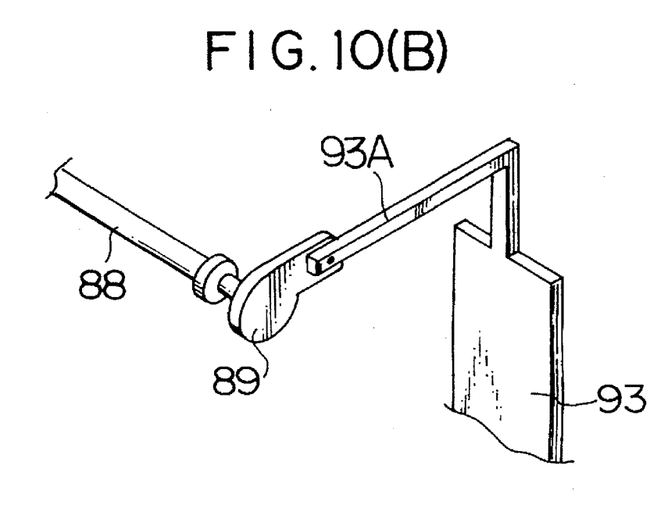

FIGS. 10 (A) and 10 (B) are views illustrating the structure of the essential portions in the other embodiments according to the present invention. In FIGS. 10 (A) and 10 (B), the same reference numbers are designated on the same or similar members as those of the embodiment in FIG. 6, and an explanation is omitted here. The embodiments in FIGS. 10 (A) and 10 (B) are different from the embodiment in FIG. 6 in that the axis rotating lever 89 and the CHP lever 93 are integrated with elastic bodies instead of the spring 92, respectively.

That is, in the embodiment as shown in FIG. 10 (A), the elastic body 89B is integrated with the tip of the axis rotating lever 89, and the elastic body 89B is engaged with the tip of the CHP lever 93. The axis rotating lever 89 is made of a material such as plastic having the elasticity, so that the elastic body 89B can be formed at the tip of the axis rotating lever 89.

As a result, the up and down displacement of the CHP lever 93 is transmitted to the visual field switching axis 88 via the axis rotating lever 89 having the elastic body 89B. In this case, the displacement of the CHP lever 93 exceeding the rotational stroke of the axis rotating lever 89 is absorbed by the deformation of the elastic body 89B, so that the axis rotating lever 89 is positioned steadily at the end of the stroke.

In the embodiment as shown in FIG. 10 (B), an elastic body 93A is integrated with the tip of the CHP lever 93, and the end of the elastic body 93A connects to the axis rotating lever 89. The CHP lever 93 is made of a material such as plastic having the elasticity, so that the elastic body 93A can be formed at the tip of the CHP lever 93.

As a result, the up and down displacement of the CHP lever 93 is transmitted to the axis rotating lever 89 via the elastic body 93A. In this case, the displacement of the CHP lever 93 exceeding the rotational stroke of the axis rotating lever 89 is absorbed by the deformation of the elastic body 93A.

As has been described above, the finder visual field switching mechanism of the present invention is provided with the elastic member between the first lever moving together with the switching control and the second lever moving together with the first lever and transmitting the power for moving the visual field frame pieces. The elastic member elastically transmits the displacement of the first lever to the second lever. The displacement of the first lever exceeding the area for the second lever to move is absorbed by the elastic member, and the second lever can be positioned at the end of the stroke. As a result, the visual field frame pieces can abut against the positioning stoppers, and the visual field conforming to the PAR can be determined accurately.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A visual field switching mechanism of a finder having a first visual field frame arranged on an image-formation plane of subject light passing through an objective lens for restricting said subject light to a visual field conforming to a first aspect ratio, and a second visual field frame arranged close to said first visual field frame and composed of a pair of substantially L-shaped visual field frame pieces for moving said pair of visual field frame pieces in a direction so that a left-hand side and a right-hand side of said second visual field frame become closer to each other so as to determine a visual field conforming to a second aspect ratio, and moving said pair of visual field frame pieces in a direction so that a top side and a bottom side of said second visual field frame become closer to each other so as to determine a visual field conforming to a third aspect ratio, and in which a visual field conforming to one of said first, second and third aspect ratios can be selectively switched; said visual field switching mechanism of said finder, comprising:

a switching control movably held on an outer wall of a camera and selectively moved to one stop position among three stop positions corresponding to said each aspect ratio;

a first lever connecting to said switching control and moving together with said switching control;

a second lever having a second movement area smaller than a first movement area of said first lever and moving together with said first lever to transmit power for moving said visual field frame pieces;

positioning stoppers for stopping said visual field frame pieces moved by said power transmitted by said first lever and said second lever at a predetermined position where a visual field conforming to said second aspect ratio or said third aspect ratio is determined;

an elastic member provided between said first lever and said second lever, transmitting a displacement of said first lever to said second lever, and deforming elastically in response to a displacement of said first lever exceeding said second movement area of said second lever; and wherein said second lever is positioned at one of end of a stroke in said second movement area by elastic force induced by said deforming of said elastic member, so that said visual field frame pieces abut against said positioning stoppers.

2. The finder visual field switching mechanism according to claim 1, wherein said elastic member is integrated with said first lever or said second lever.

3. The finder visual field switching mechanism according to claim 1, wherein said first, second and third aspect ratios are a high-vision size, a conventional size, and a panoramic size, respectively.

4. The finder visual field switching mechanism according to claim 1, wherein said first lever is held in such a manner to move straight freely, and said second lever is held rotatively and provided with a mechanism for switching a straight displacement of said first lever to a rotational length of said second lever.

* * * * *